(12) United States Patent
Kelly et al.

(10) Patent No.: US 6,952,488 B2
(45) Date of Patent: Oct. 4, 2005

(54) SYSTEM AND METHOD FOR OBJECT LOCALIZATION

(75) Inventors: Alonzo J. Kelly, Sewickley, PA (US); Yu Zhong, Waltham, MA (US)

(73) Assignee: Carnegie Mellon University, Pittsburgh, PA (US)

( * ) Notice: Subject to any disclaimer, the term of this patent is extended or adjusted under 35 U.S.C. 154(b) by 701 days.

(21) Appl. No.: 09/940,095

(22) Filed: Aug. 27, 2001

(65) Prior Publication Data

US 2003/0044047 A1 Mar. 6, 2003

(51) Int. Cl.[7] ................................................ G06K 9/00
(52) U.S. Cl. ...................... 382/104; 382/153; 382/171; 701/28
(58) Field of Search ................................ 382/104, 106, 382/103, 153, 169, 171, 199, 164, 173; 340/907, 933, 937; 348/113; 244/3.11; 701/28, 200; 700/258, 259; 414/1, 137.1

(56) References Cited

U.S. PATENT DOCUMENTS

| | | | | |
|---|---|---|---|---|
| RE29,025 E | * | 11/1976 | Hansen | 356/138 |
| 4,279,328 A | * | 7/1981 | Ahlbom | 187/224 |
| 4,566,032 A | * | 1/1986 | Hirooka et al. | 348/119 |
| 4,845,765 A | * | 7/1989 | Juvin et al. | 382/153 |
| 5,345,080 A | * | 9/1994 | Yajima et al. | 250/311 |
| 5,586,620 A | * | 12/1996 | Dammeyer et al. | 187/227 |
| 5,738,187 A | * | 4/1998 | Dammeyer et al. | 187/222 |
| 5,999,866 A | | 12/1999 | Kelly et al. | |
| RE37,215 E | * | 6/2001 | Dammeyer et al. | 187/222 |
| 2001/0022616 A1 | * | 9/2001 | Rademacher et al. | 348/148 |

OTHER PUBLICATIONS

Kim et al., "Computer Vision Assisted Semi–Automatic Virtual Reality Calibration," *IEEE Conf. on Robotics & Automation*, Albuquerque, NM, Apr. 1997.
Kim et al., "Calibrated Synthetic Viewing," *American Nuclear Society (ANS) 7th Topical Meeting on Robotics and Remote Systems*, Augusta, GA, Apr., 1997.
Kelly, "Contemporary Feasibility of Image Based Vehicle Position Estimation," *Proceedings of International Conference on Robotics and Applications (IASTED)*, Oct. 1999.
Rowe et al., "Map Construction for Mosaic–Based Vehicle Position Estimation," *International Conference on Intelligent Autonomous Systems (IAS6)*, Jul. 2000.
Kelly, "Pose Determination and Tracking in Image Mosaic Based Vehicle Position Estimation," *International Conference on Intelligent Robots and Systems (IROS00)*, Oct. 2000.
Kim et al., "Model–Based Object Pose Refinement for Terrestrial and Space Autonomy," *ISAIRAS Conference*, Montreal, Canada, Jun. 2001.

* cited by examiner

Primary Examiner—Bhavesh M. Mehta
Assistant Examiner—Barry Choobin
(74) Attorney, Agent, or Firm—Kirkpatrick & Lockhart Nicholson Graham LLP

(57) ABSTRACT

A computer-assisted method for localizing a rack, including sensing an image of the rack, detecting line segments in the sensed image, recognizing a candidate arrangement of line segments in the sensed image indicative of a predetermined feature of the rack, generating a matrix of correspondence between the candidate arrangement of line segments and an expected position and orientation of the predetermined feature of the rack, and estimating a position and orientation of the rack based on the matrix of correspondence.

41 Claims, 13 Drawing Sheets

SYSTEM AND METHOD FOR OBJECT LOCALIZATION

Certain of the research leading to the present invention was sponsored by the United States National Aeronautics and Space Administration (NASA) under contract NCC5-223. The United States Government may have rights in the invention.

BACKGROUND OF THE INVENTION

1. Field of the Invention

The present invention is directed generally to vision-based guidance systems and methods and, more particularly, to vision-based systems and methods for detecting, recognizing, and localizing objects.

2. Description of the Background

In the material handling industry, dunnage, such as racks and pallets, is typically lifted, transported, and stacked by human-operated fork lift vehicles. As with most industries, however, there is an ever-increasing motivation to automate such tasks to realize the benefits associated therewith. There are several limiting factors which prevent many material handling applications from becoming substantially automated. For example, most material handling operations are performed in environments which are not conducive to prior vision-based recognition systems. Such environments include assembly factories, warehouses, truck trailers, and loading docks. These environments present problems for typical prior vision-based recognition systems because of, for example, poor lighting and obstructed images. Thus, prior vision-based recognition systems typically cannot robustly and reliably detect, recognize, and localize the objects to be manipulated by the automated system.

In order to augment the ability to detect, recognize, and localize the objects, some prior guidance systems utilize infrastructure, such as laser and inertial guidance systems, to guide the automated vehicles. Such infrastructure, however, is expensive. Furthermore, once the infrastructure is in place, the facility usually cannot be easily altered without the additional expense of modifying the infrastructure.

Accordingly, there exists a need for a guidance system for material handling vehicles or other automated vehicles which operates with minimal infrastructure. There further exists a need for a guidance system for vehicles which is capable of robustly and reliably detecting and recognizing the objects within the working environment of the vehicle, and accurately localizing objects to be manipulated.

SUMMARY OF THE INVENTION

The present invention is directed to a computer-assisted method for localizing an object. According to one embodiment, the method includes sensing an image of the rack, detecting line segments in the sensed image, recognizing a candidate arrangement of line segments in the sensed image indicative of a predetermined feature of the rack, generating a matrix of correspondence between the candidate arrangement of line segments and an expected position and orientation of the predetermined feature of the rack, and estimating a position and orientation of the rack based on the matrix of correspondence.

According to another embodiment, the present invention is directed to a method of stacking an upper rack on a lower rack, the upper rack having first and second legs a fixed distance apart and the lower rack having first and second receptacles a fixed distance apart, including sensing a first image including the first leg of the upper rack and the first receptacle of the lower rack, sensing a second image including the second leg of the upper rack and the second receptacle of the lower rack, detecting line segments in the first image, detecting line segments in the second image, recognizing a candidate arrangement of line segments in the first image indicative of a predetermined feature of the first leg and a predetermined feature of the first receptacle, recognizing a candidate arrangement of line segments in the second image indicative of a predetermined feature of the second leg and a predetermined feature of the second receptacle, generating a first matrix of correspondence between the candidate arrangement of line segments indicative of the first leg and the first receptacle and an expected position and orientation of the first leg and first receptacle, generating a second matrix of correspondence between the candidate arrangement of line segments indicative of the second leg and the second receptacle and an expected position and orientation of the second leg and second receptacle, determining a relative distance between the first leg and the first receptacle based on the first matrix of correspondence, and determining a relative distance between the second leg and the second receptacle based on the second matrix of correspondence.

The present invention represents an advance over prior vision-based guidance systems and methods in that the present invention is operable in the absence of expensive infrastructure. The present invention further represents an advance over the relevant art in that it is capable of robustly and reliably detecting, recognizing, and localizing objects. These and other advantages and benefits of the present invention will become apparent from the description hereinbelow.

BRIEF DESCRIPTION OF THE DRAWINGS

For the present invention to be clearly understood and readily practiced, the present invention will be described herein in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements found in a typical vision-based guidance system. For example, specific operating system details and modules contained in the processor are not shown. Those of ordinary skill in the art will recognize that these and other elements may be desirable to produce a system incorporating the present invention. However, because such elements are well known in the art, and because they do not facilitate a better understanding of the present invention, a discussion of such elements is not provided herein.

Figure 1:
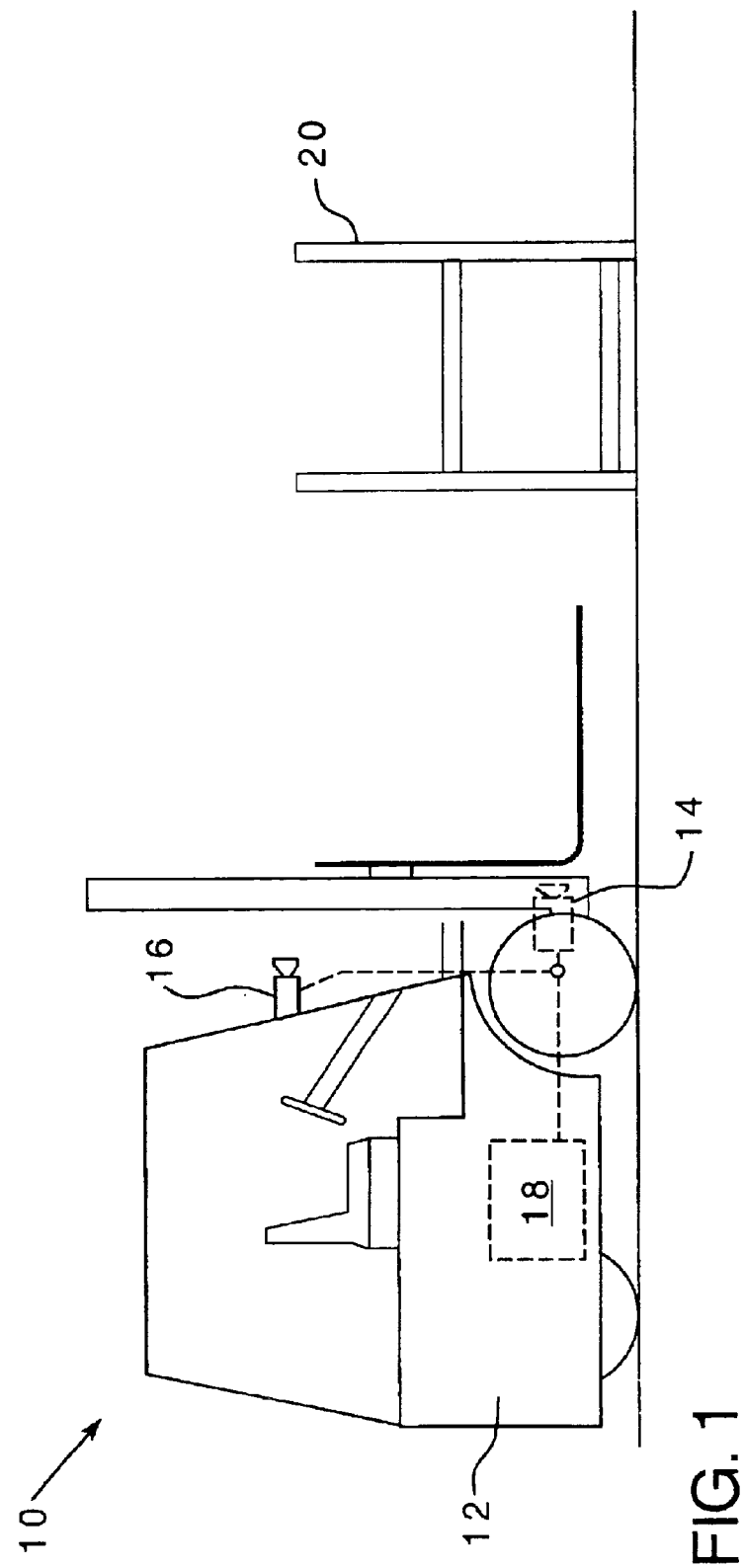
FIG. 1 is a diagram illustrating an object localization system according to an embodiment of the present invention.

FIG. 1 is a diagram of a system 10 according to one embodiment of the present invention implemented for use in a material handling vehicle 12. The vehicle 12 may be, for example, a fork lift truck. The system 10 includes sensors 14, 16 in communication with a processor 18. The system 10 may be used, for example, to detect, recognize, and localize objects within the environment of the vehicle 12 such as, for example, a rack 20, a pallet (not shown), or other material handling dunnage. The system 10 may also be used, for example, to stack objects such as, for example, a number of racks 20. The present invention will be described herein as being implemented in a material handling vehicle 12. However, the benefits of the present invention may be implemented in any application requiring reliable and robust object detection, recognition, and localization.

The number of sensors 14, 16 required by the system 10 depends on the particular application. The sensors 14, 16 may be any configuration that creates imagery, including, for example, non-contact based sensing devices, such as devices based on electromagnetic, sound, or other radiation, and contact based sensing devices, such as tactile arrays. The sensors 14, 16 may be, for example, monochrome cameras, color cameras, multi-spectral cameras, laser rangefinder range channels and/or intensity channels, radar systems, sonar systems, or any combination thereof The sensors 14, 16 include a digitizer for digitizing a sensed image. According to one embodiment of the present invention, each sensor 14, 16 is a Sony®XC-75 CCD camera. The digitized images from the sensors 14, 16 are input to the processor 18.

Figure 2:
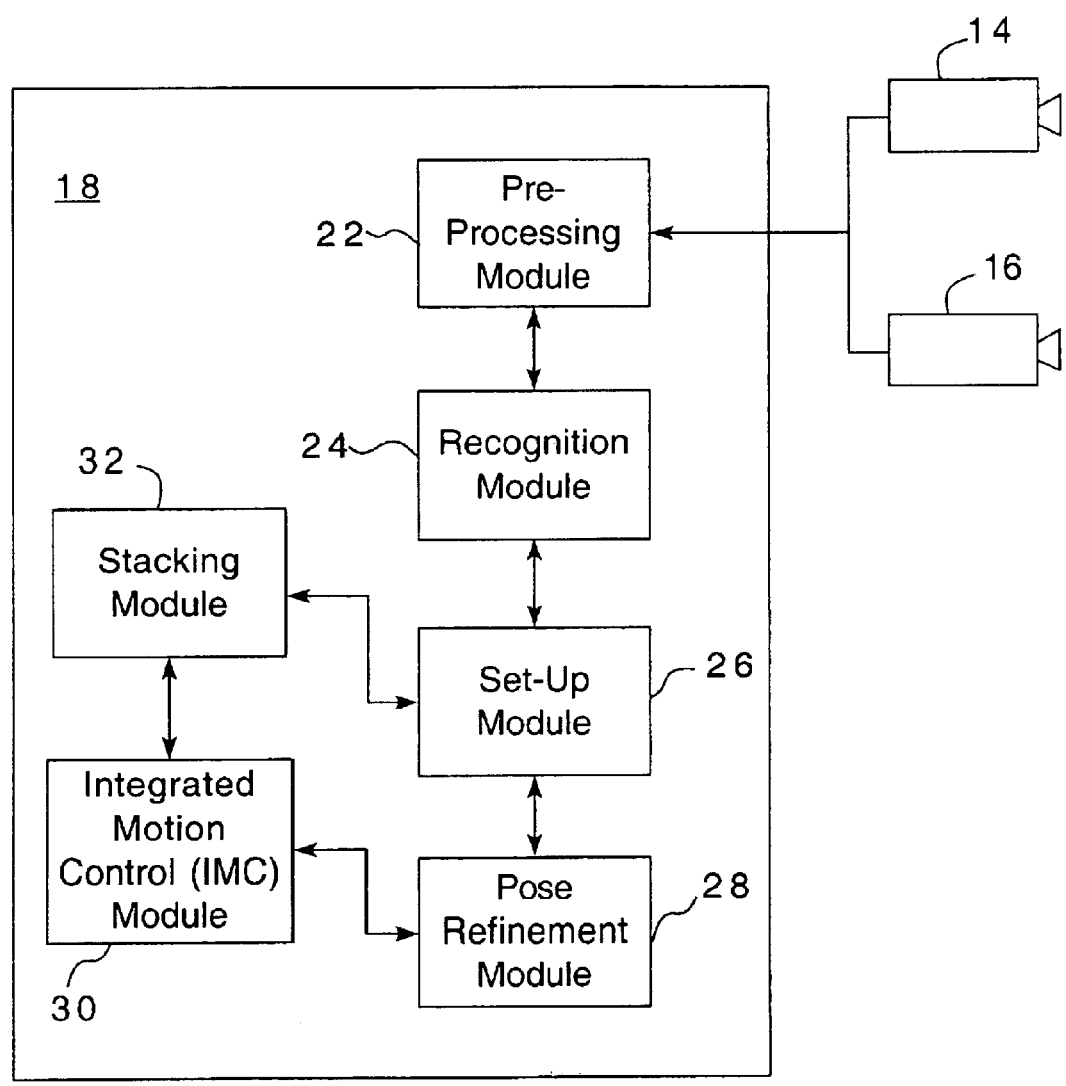
FIG. 2 is a block diagram illustrating various software modules of the processor of the system of FIG. 1.

FIG. 2 is a block diagram of the processor 18 according to one embodiment of the present invention. The processor 18 may be implemented as, for example, a computer, such as a workstation or a personal computer, a microprocessor, or an application specific integrated circuit (ASIC). The processor 18 includes a preprocessing module 22, a recognition module 24, a set-up module 26, a pose refinement module 28, an integrated motion control module 30, and a stacking module 32. The modules 22, 24, 26, 28, 30, and 32 may be implemented as software code to be executed by the processor 18 using any type of computer instruction types such as, for example, microcode, and can be stored in, for example, an electrically erasable programmable read only memory (EEPROM), or can be configured into the logic of the processor 18. The modules 22, 24, 26, 28, 30, and 32 may alternatively be implemented as software code to be executed by the processor 18 using any suitable computer language such as C or C++ using, for example, conventional or object-oriented techniques. The software code may be stored as a series of instructions or commands on a computer-readable medium, such as a random access memory (RAM), a read-only memory (ROM), magnetic media such as a hard-drive or a floppy disk, or optical media such as a CD-ROM. The code may also be configured into the logic of the processor 18.

Figure 4:
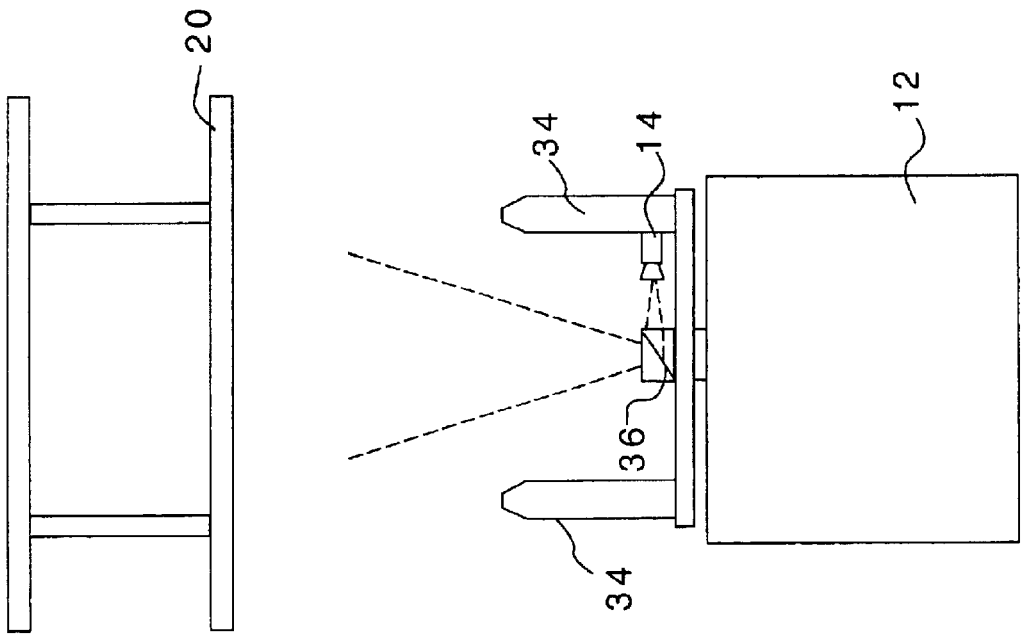
FIG. 4 is a top-plan view of another embodiment of the system of FIG. 1.
Figure 3:
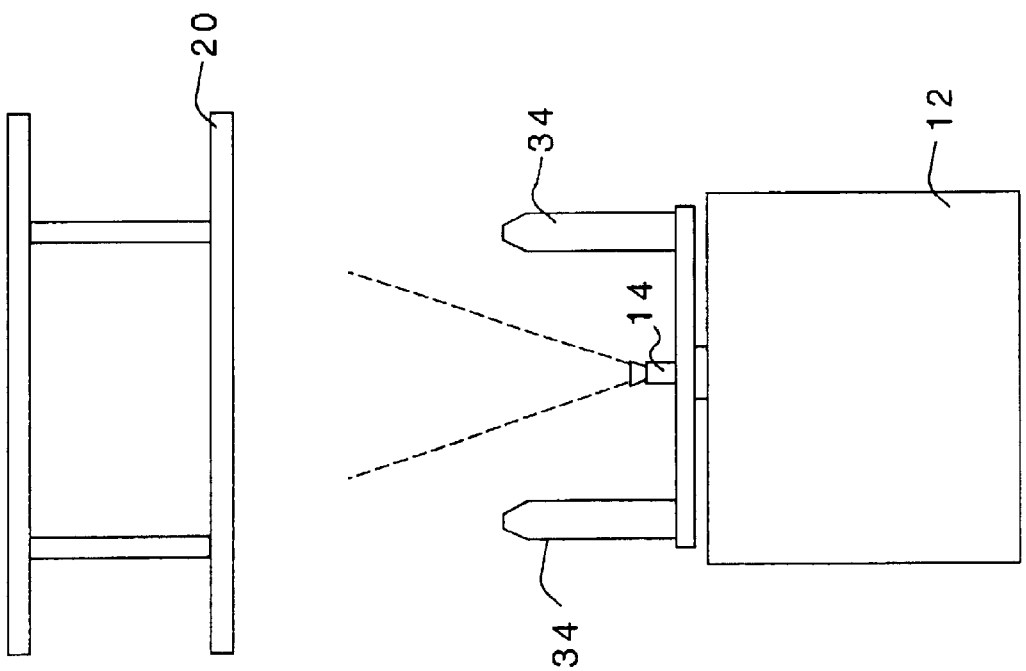
FIG. 3 is a top-plan view of an embodiment of the system of FIG. 1.

The system 10 may be utilized to detect and recognize the presence of, for example, dunnage, such as the rack 20, in the working environment of the material handling vehicle 12. The system 10 may then be utilized to localize the rack 20 by estimating the position and orientation ("pose") of the rack 20. With an estimate of the rack's pose, the system 10 may be used to guide the vehicle 12 to pick up the rack 20. According to one embodiment, the system 10 includes one sensor 14 oriented to capture images of the rack 20 in the working environment of the vehicle 12. The sensor 14 may, for example, be positioned between the forks 34 of the vehicle 12, as illustrated in FIG. 3, to capture images of the rack 20 in front of the vehicle 12. In an alternative embodiment, illustrated in FIG. 4, the sensor 14 may be positioned in a protected position adjacent one of the forks 34 of the vehicle 12. According to this embodiment, a mirror 36 may be positioned at, for example, a forty-five degree angle relative to the sensor 14, in order that the sensor 14 may capture images of the rack 20 in front of the vehicle 12. For the embodiment illustrated in FIG. 4, the modules of the processor 18 may be programmed to account for the fact that images captured by the sensor 12 using the mirror 36 are inverted.

Referring to FIG. 2, digitized images from the sensor 14 of, for example, the rack 20 and its surrounding environment, are input to the preprocessing module 22 of the processor 18. The preprocessing module 22 detects line segments in the sensed image, which are used to find edges of features or objects in the image. An edge may be considered an area of the image where color and/or intensity in the captured image changes rapidly. The preprocessing module 22 may in addition, for example, enhance texture and remove shadows, lens distortion, bias, and scale in the captured image.

Figure 5:
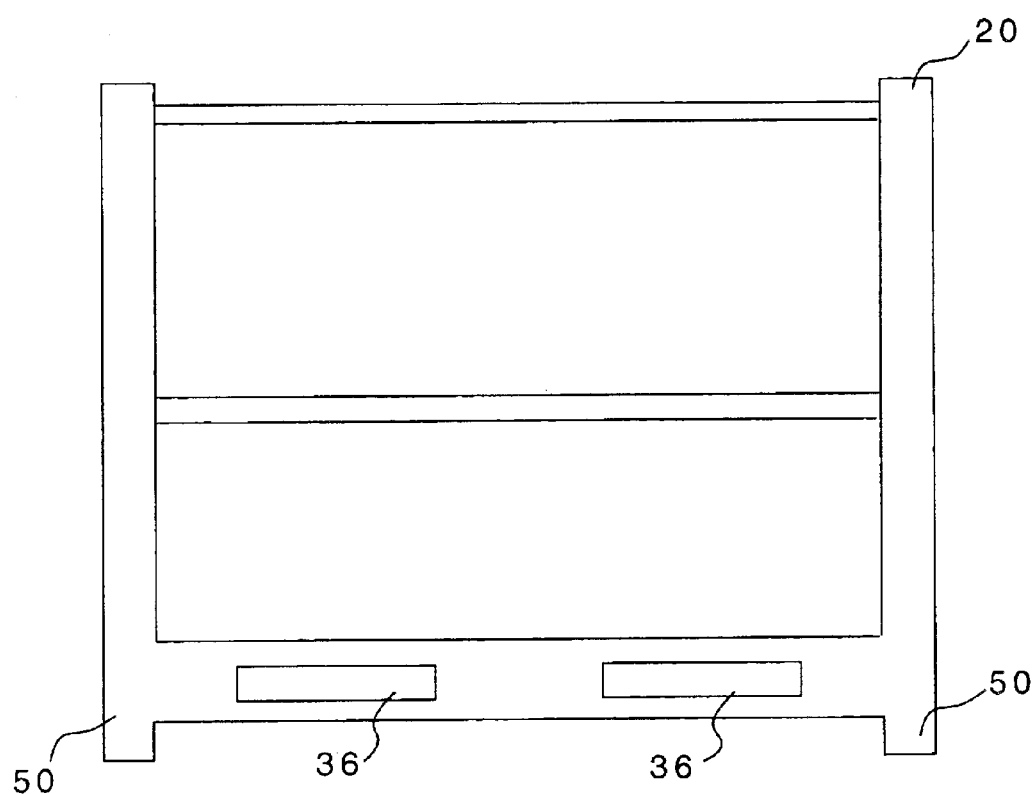
FIG. 5 is a front view diagram illustrating a rack.

The recognition module 24 is in communication with the preprocessing module 22 and, from the found edges determined by the preprocessing module 22, detects and recognizes a particular arrangement of line segments. For example, for an embodiment of the present invention in which the system 10 is used to detect, recognize, and localize the rack 20, a diagram of which is illustrated in FIG. 5, the recognition module 24 may detect, recognize, and localize features indicative of the rack 20. For example, the recognition module 24 may detect, recognize, and localize the edges of the fork lift holes 36 of the rack 20, through which the forks 34 of the vehicle 12 are inserted to lift and transport the rack 20. The recognition module 24 can assume that a pair of fork lift holes 36 are within the sensed image when the system 10 is used to detect the rack 20. Further, to reduce computation and hence augment system robustness, the system 10 may assume that the positions of the fork lift holes 36 are fixed relative to each other and relative to the rack 20. The recognition module 24 may detect, recognize, and localize the fork lift holes 36 by first grouping the line segments of the sensed image of the rack 20 as determined by the preprocessing module 22 to form candidate shapes, such as rectangles, which may correspond to the shape of the fork lift holes 36. The recognition module 24 may then pair candidate shapes to recognize candidate fork lift holes 36. The recognition module 24 preferably generates false positive and false negative recognitions of the object infrequently, i.e., sufficiently infrequent to support the particular application for the system 10.

Figure 8:
FIG. 8 is a diagram illustrating the image of the rack of FIG. 6 having the line segments corresponding to the fork lift holes of the rack highlighted.
Figure 7:
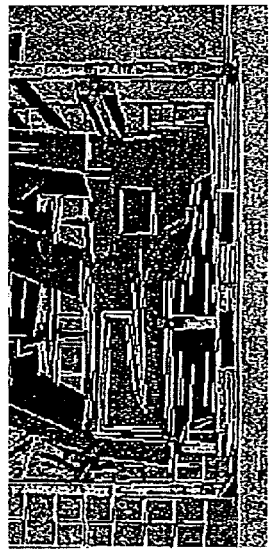
FIG. 7 is a diagram illustrating the image of the rack of FIG. 6 having line segments in the image highlighted.
Figure 6:
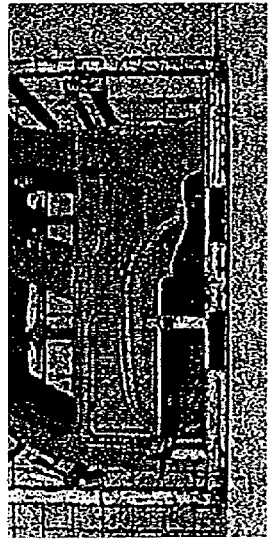
FIG. 6 is a diagram illustrating a sensed image of the rack of FIG. 5.

FIGS. 6–8 illustrate an example of the operation of the recognition module 24. FIG. 6 illustrates an image of the rack 20 as sensed by the sensor 14. The preprocessing module 22 finds edges in the sensed image of the rack 20. Based on the found edges, the recognition module 24 detects candidate shapes in the sensed image which may correspond to the fork lift holes 36. As illustrated in FIG. 7, there are many candidate shapes in the image which correspond to rectangles. The recognition module 24 then recognizes the candidate fork lift holes 36, as illustrated in FIG. 8, by pairing candidate rectangles to recognize the two rectangles which most closely correspond to the actual configuration of the fork lift holes 36. The recognition module 24 determines the rectangles which most closely correspond to the actual configuration of the fork lift holes 36 by, for example, determining the pair of rectangles which appear planar and possess a normalized height to width ratio corresponding to the actual fork lift holes 36.

If the recognition module 24 is able to recognize a pair of candidate fork lift holes 36, the system 10 then estimates the position and orientation ("pose") of the fork lift hole 36 (and therefore the rack 20) relative to the sensor 14. If there are zero degrees of freedom between the sensor 14 and the vehicle 12, by determining the pose of the rack 20 relative to the sensor 14, the pose of the rack 20 relative to the vehicle 12 can be derived therefrom. The system 10 may, for example, determine the pose of the rack 20 based on a familiar computer-vision based matrix formula:

$$f_i = P \times F_w \quad (1)$$

where $F_w$ is a vector of features representative of the real-world environment of the vehicle 12, P is a perspective transformation matrix, and $f_i$ is a vector of features representative of the sensed image. The vectors $F_w$ and $f_i$ may include elements representative of, for example, points, line segments, planes, etc.

Figure 9:
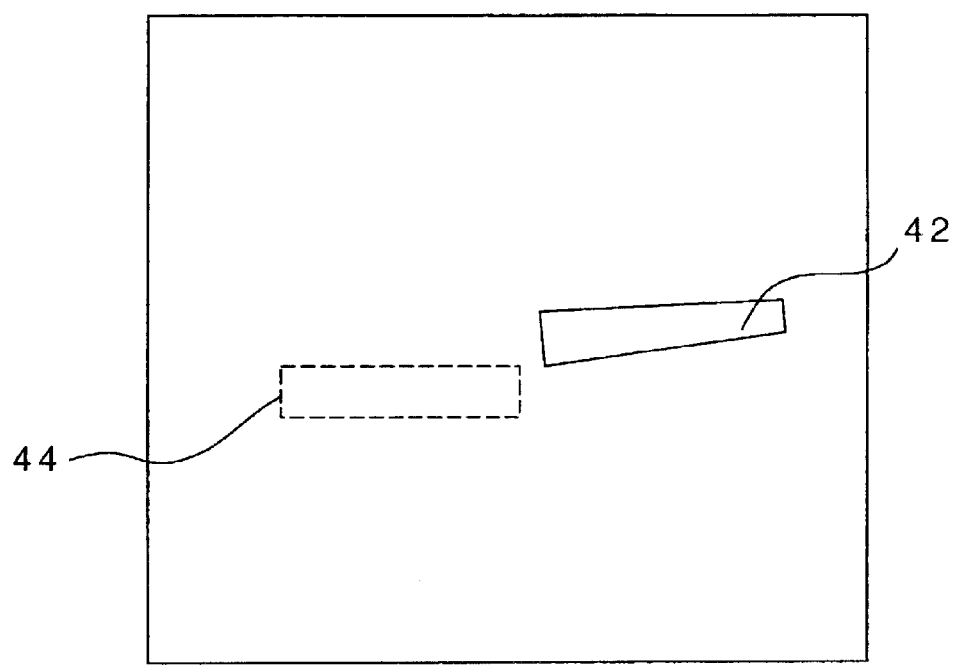
FIG. 9 is a diagram illustrating an image of a fork lift hole and an expected image of a fork lift hole.

The set-up module 26 generates the matrix of correspondence, which is used by the pose refinement module 28, as described hereinbelow, to estimate the pose of the rack 20. The set-up module 26 is in communication with the recognition module 24, and determines whether a particular set of line segments of the candidate fork holes corresponds to an expected position and orientation (pose) for the fork holes. For example, referring to FIG. 9, the set-up module 26 determines whether the particular set of line segments comprising rectangle 42, representative of an actual candidate fork lift hole, corresponds to an expected set of line segments comprising dashed rectangle 44, representative of the expected pose for the fork lift hole. For the configuration illustrated in FIG. 9, for example, the actual candidate fork lift, represented by rectangle 42, is a hole further from the vehicle 12 than the expected fork lift hole, represented by dashed rectangle 44, and is rotated relative to the expected fork lift hole.

For a robust system 10, the set-up module 26 makes the determination that the actual candidate fork lift hole corresponds to the expected fork lift hole quickly, i.e., sufficiently fast to support the particular application for which the system 10 is being used. In addition, the set-up module 26 may make this determination even if portions of the line segments representative of the actual candidate fork lift hole are occluded such as, for example, by debris present in the environment of the vehicle 12.

The pose refinement module 28 is in communication with the set-up module 26, and computes the estimated pose of the rack 20 according to the matrix of correspondence generated by the set-up module 26. According to one embodiment of the present invention, the pose refinement module 28 uses model-based edge matching algorithms to compute the estimated pose of the rack 20 using a least-square technique that simultaneously updates both sensor and object (rack 20) localization, as described in Kim et al., "Computer Vision Assisted Semi-Automatic Virtual Reality Calibration," *IEEE Int. Conference on Robotics & Automation*, submitted, April 1997 and Kim et al., "Calibrated Synthetic Viewing." *American Nuclear Society (ANS) 7th Topical Mtg. on Robotics and Remote Systems*, Augusta, Ga., April 1997, which are incorporated herein by reference. According to other embodiments of the invention, alternative algorithms may be used, such as, for example, model-based point matching algorithms.

For an embodiment utilizing a model-based edge matching technique, a given 3-D object model point $(x_m, y_m, z_m)$ in object model coordinates and its 2-D image plane projection $(u_m, v_m)$ in sensor image coordinates are related by:

$$w \begin{bmatrix} u_m \\ v_m \\ 1 \end{bmatrix} = PVM \begin{bmatrix} x_m \\ y_m \\ z_m \\ 1 \end{bmatrix} = CM \begin{bmatrix} x_m \\ y_m \\ z_m \\ 1 \end{bmatrix}, \quad (2)$$

where w is an arbitrary scale factor for homogeneous coordinates, and the 3×4 perspective projection matrix P is defined by the sensor effective focal length. The inverse of the 4×4 camera viewing transform V describes the sensor pose, and the 4×4 object pose transform M describes the object pose relative to the world reference frame.

In the edge based model matching, the distances between the projected 2-D model and actual 2-D image line segments are minimized in the least squares sense. Let $(u_{m1}, v_{m1})$ and $(u_{m2}, v_{m2})$ denote the computed 2-D image plane projections of the two endpoints of a 3-D model line $(x_{m1}, y_{m1}, z_{m1})$ and $(x_{m2}, y_{m2}, z_{m2})$. Further, let $(u_{i1}, v_{i1})$ and $(u_{i2}, v_{i2})$ denote the corresponding actual 2-D image line endpoints detected on the real sensor view by a local edge detector. The normal distances from the actual image line endpoints to the model line segment projected on the image plane are given by:

$$d_1 = (Au_{i1} + Bv_{i1} + C)/M, \quad (3)$$

$$d_2 = (Au_{i2} + Bv_{i2} + C)/M, \quad (4)$$

where $A = v_{m2} - v_{m1}$, $B = u_{m1} - u_{m2}$, $C = u_{m2}v_{m1} - u_{m1}v_{m2}$, and $M = \sqrt{A^2 + B^2}$. By assuming that the least squares solution is to minimize the sum of all the normals distances, 2N equations from N pairs of corresponding model and image line segments can be realized:

$$F = \begin{bmatrix} d_2 \\ d_2 \\ \vdots \\ d_{2N} \end{bmatrix} = 0. \quad (5)$$

The above equations for a single object model with a single sensor view can be extended for the simultaneous update of two object models with two sensor views:

$$F_{C1M1}(x_{C1}) = 0 \quad (6)$$

$$F_{C2M1}(x_{C2}) = 0 \quad (7)$$

$$F_{C1M2}(x_{C1}, x_{M2}) = 0 \quad (8)$$

$$F_{C2M2}(x_{C2}, x_{M2}) = 0 \quad (9)$$

or, in a combined form with 20 unknown variables, $$F(x) = 0, \quad (10)$$

$$x = \begin{bmatrix} X_{C1} \\ X_{C2} \\ X_{M2} \end{bmatrix}, \quad (11)$$

where $x_{C1} = (\alpha_{C1}, \beta_{C1}, \gamma_{C1}, \chi_{C1}, y_{C1}, z_{C1}, f_{C1})^T$ for the sensor 1 pose inverse and effective focal length, $x_{C2} = (\alpha_{C2}, \beta_{C2}, \gamma_{C2}, \chi_{C2}, y_{C2}, z_{C2}, f_{C2})^T$ for the sensor 2 pose inverse and effective focal length, and $x_{M2} = (\alpha_{M2}, \beta_{M2}, \gamma_{M2}, \chi_{M2}, y_{M2}, z_{M2})^T$ for object pose 2. Note that three rotational angles ($\alpha$, $\beta$, $\gamma$) are used instead of the nine elements of the rotation matrix for computational efficiency. Also note that the object pose $M_1$ is assumed given and fixed, since one frame must be fixed to get a unique solution. For more than ten corresponding model and image lines, the nonlinear least squares solution of (10) can be obtained by the Newton-Gauss method. Its Jacobian is given by:

$$J = \frac{\partial F}{\partial x} = \begin{bmatrix} \frac{\partial Fc_1M_1}{\partial xc_1} & 0 & 0 \\ 0 & \frac{\partial Fc_2M_1}{\partial xc_2} & 0 \\ \frac{\partial Fc_1M_2}{\partial xc_1} & 0 & \frac{\partial Fc_1M_2}{\partial x_{M2}} \\ 0 & \frac{\partial Fc_2M_2}{\partial xc_2} & \frac{\partial Fc_2M_2}{\partial x_{M2}} \end{bmatrix}. \quad (12)$$

The following relation derived from (2), for example, can be used to compute the Jacobian.

$$\frac{\partial d_1}{\partial x} = \left( u_{i1}\frac{\partial A}{\partial x} + v_{i1}\frac{\partial B}{\partial xB} + \frac{\partial C}{\partial x} \right) / M - \left( A\frac{\partial A}{\partial x} + B\frac{\partial B}{\partial x} \right) \left( \frac{d_1}{M^2} \right), \quad (13)$$

where A, B, and C are functions of $u_{m1}$, $v_{m1}$, $u_{m2}$, and $v_{m2}$.

The pose refinement module 28 is in communication with the integrated motion control (IMC) module 30 to establish a visual servo capable of guiding the vehicle 12 to, for example, advance toward the rack 20 and, for example, pick up the rack 20. The IMC module 30 guides the vehicle 12 by, for example, providing power and steering commands to the vehicle 12. As the vehicle 12 is guided toward the rack 20, the system 10 continually updates the estimated pose of the rack 20 as described hereinbefore. The IMC module 30 guides the vehicle 12 based on the continually-updated estimate of the pose of the rack 20. System robustness may be augmented by exploiting the fact that the estimated pose of the rack 20 not need be as accurate when the vehicle 12 is relatively far from the rack 20. Such an IMC module 30 is known in the art and is not further discussed herein.

Figure 10:
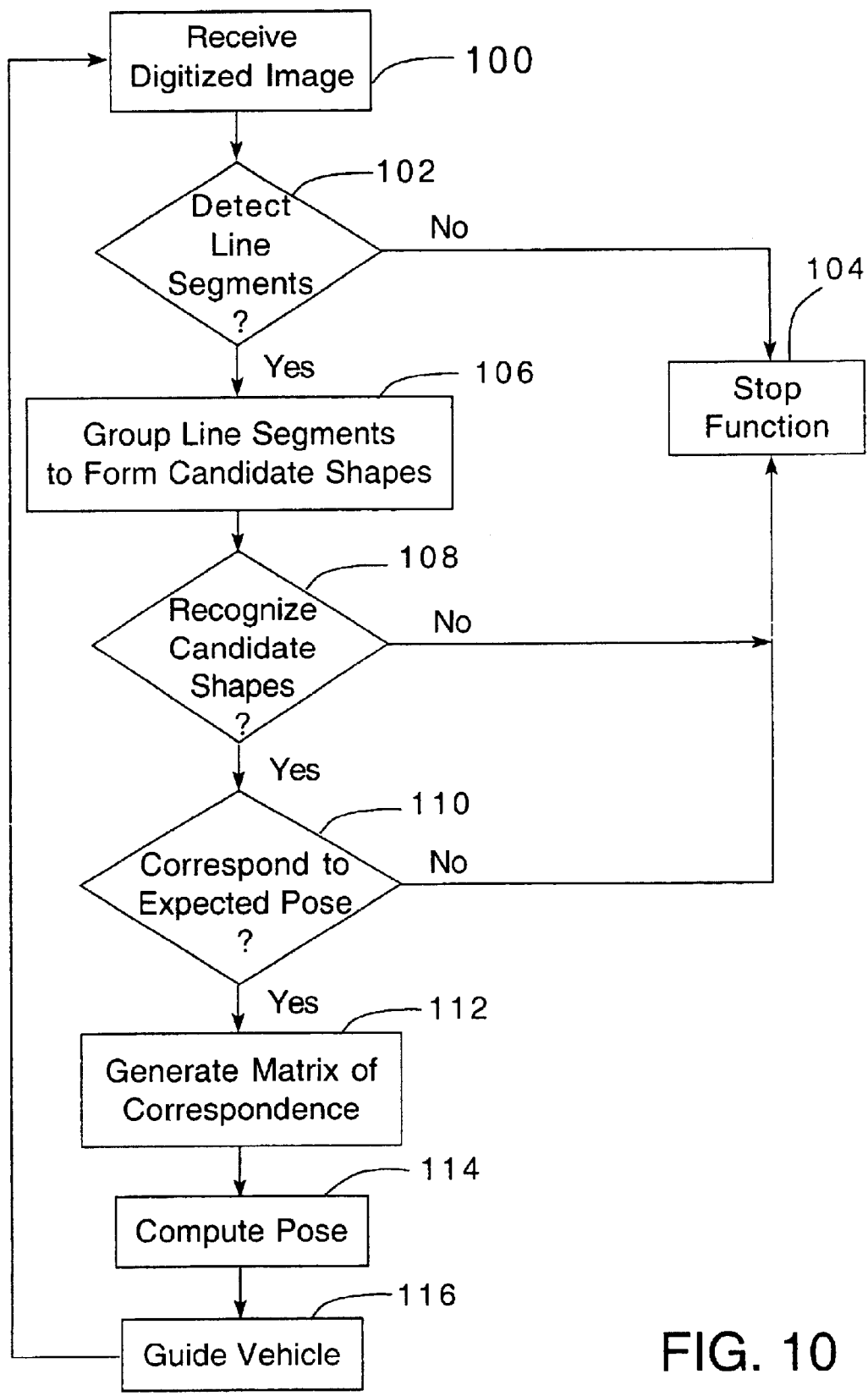
FIG. 10 is a block diagram illustrating the process flow through the processor of FIG. 2 according to one embodiment of the present invention.

FIG. 10 is a diagram illustrating a process flow through the processor 18 according to one embodiment of the present invention in which the system 10 is utilized to detect, recognize, and localize an object, such as the rack 20. The process flow begins at block 100, where a digitized image of the environment of the vehicle 12 is received. As described hereinbefore, the processor 18 can assume that the object to be detected, such as the rack 20, is in the image. The process continues to block 102, where line segments in the digitized image are detected. If no line segments are detected in the image, the flow proceeds to block 104, causing the system 10 to stop. The function of blocks 100 and 102 may be performed by the preprocessing module 22, as described hereinbefore.

If sufficient line segments are detected in the image at block 102, the flow proceeds to block 106, where the line segments detected in the image are grouped to form candidate shapes which may correspond to a feature of the object to be detected, such as the fork lift holes 36 of the rack 20. From block 106 the flow advances to block 108, where groups of line segments forming the candidate shapes are recognized. If candidate shapes cannot be recognized in the image, the flow proceeds to block 104. The function of blocks 106 and 108 may be performed by the recognition module 24, as described hereinbefore.

If candidate shapes of line segments are recognized at block 108, the flow proceeds to block 110, where it is determined whether the candidate shapes correspond to an arrangement of line segments indicative of the expected pose of the feature of the object. If the candidate arrangement of line segments does not correspond to the expected pose, the flow proceeds to block 104. If the candidate arrangement of line segments does correspond to the expected pose, the flow proceeds to block 112 where the matrix of correspondence is generated. The function of blocks 110 and 112 may be performed by the set-up module 26, as described hereinbefore.

From block 112, the flow advances to block 114 where the position and orientation (pose) of the object is computed based on the generated matrix of correspondence. Block 112 may be performed by the pose refinement module 28, as described hereinbefore. From block 114, the flow advances to block 116, where instructions to guide the vehicle 10 are generated based on the computed pose of the object. The process flow then proceeds to block 100, where the process is repeated to, for example, provide a continual update of the pose of the rack 20 as the vehicle 12 is guided toward the rack 20.

Figure 11:
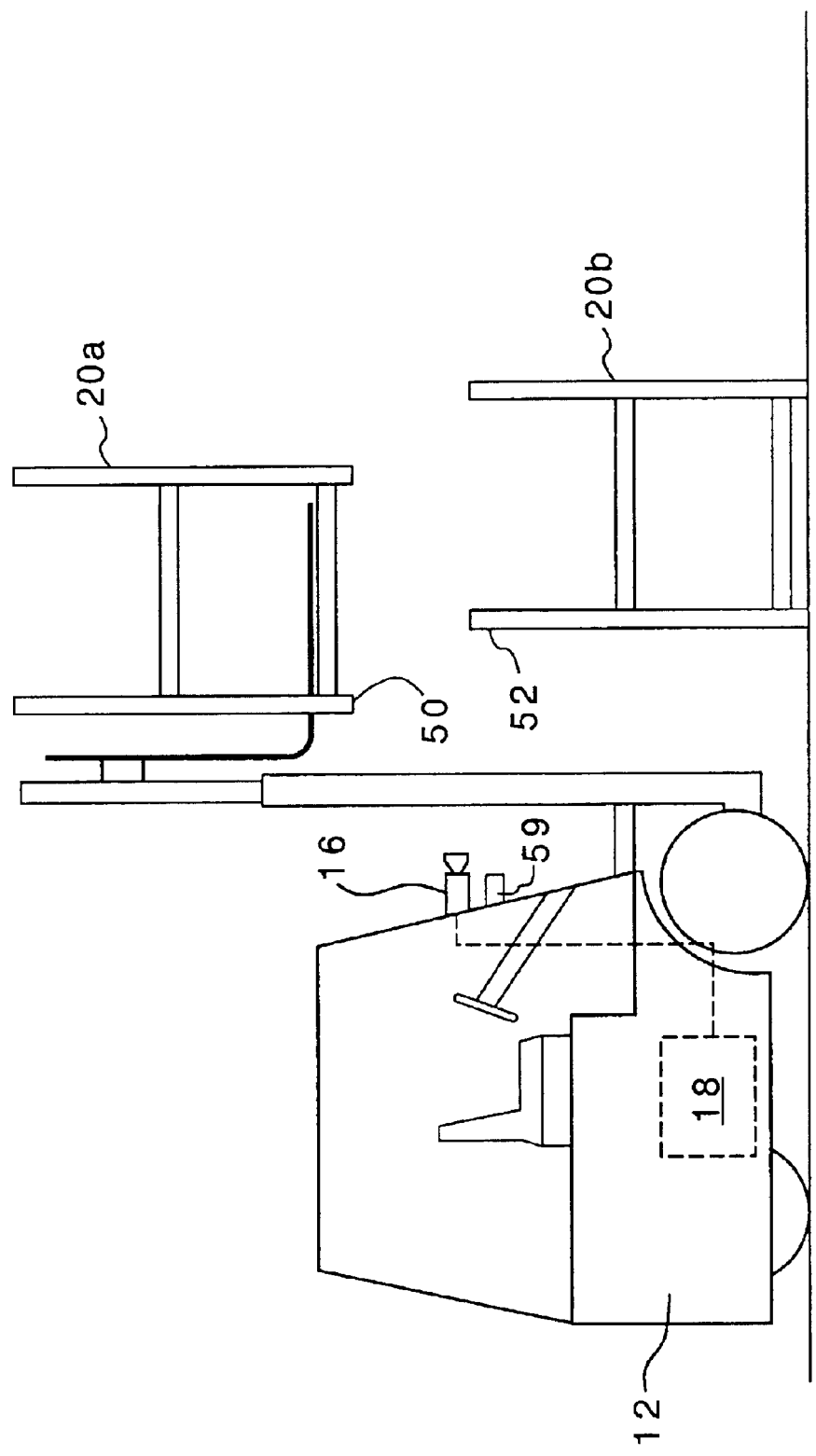
FIG. 11 is a diagram illustrating the system of the present invention according to another embodiment.
Figure 12:
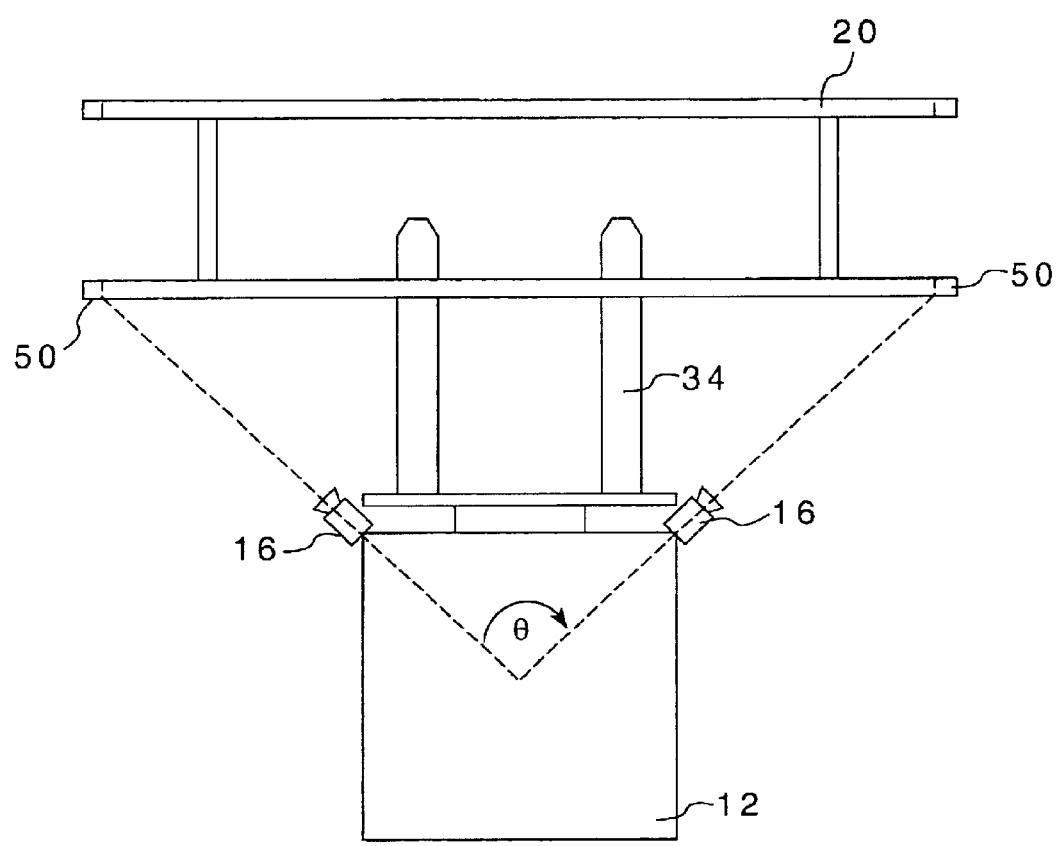
FIG. 12 is a diagram illustrating a top-plan view of the system of FIG. 10.
Figure 13:
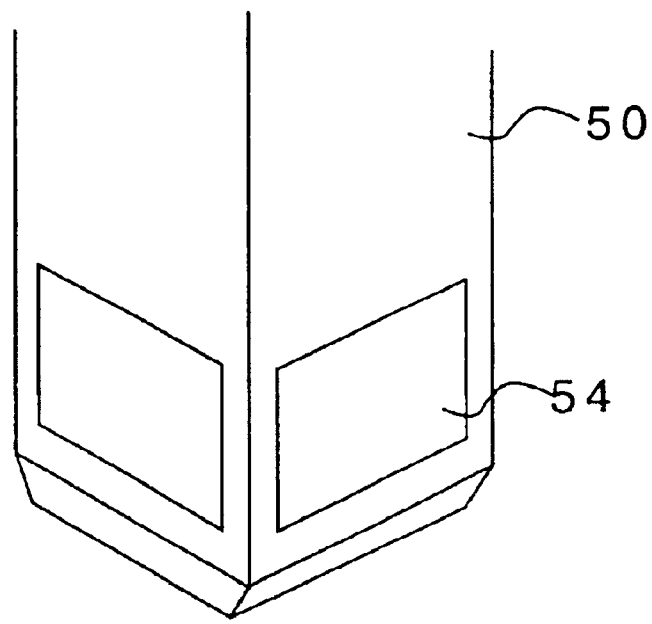
FIG. 13 is a diagram illustrating an image of the upper rack and the lower rack according to one embodiment of the present invention.
Figure 13:
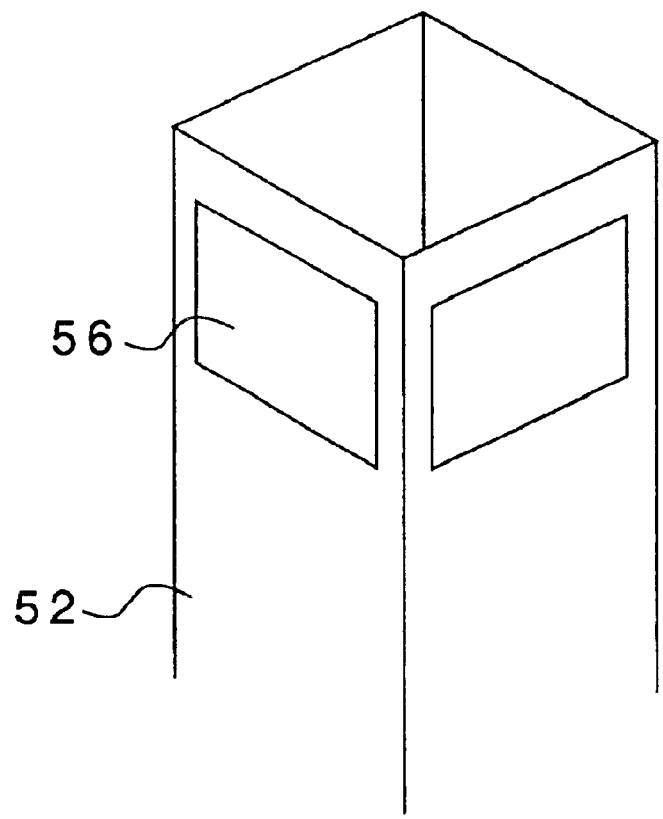

FIGS. 11 and 12 illustrate the system 10 according to another embodiment of the present invention in which the system 10 is utilized to stack objects such as, for example, the racks 20a and 20b. The system 10 includes the vehicle 12 having two sensors 16 (illustrated in FIG. 12) oriented toward a separate interface between a leg 50 of the rack 20a and a corresponding receptacle 52 of the rack 20b, in which the leg 50 is to be placed for stacking. The sensors 16 are oriented at a non-zero angle θ relative to each other, which may be, for example, ninety degrees. The sensors 16 sense and digitize separate images of the legs 50 of the rack 20a and their corresponding receptacles 52 of the rack 20b. FIG. 13 is an example of an image of a leg 50 and a receptacle 52 that may be sensed by one of the sensors 16.

Figure 14:
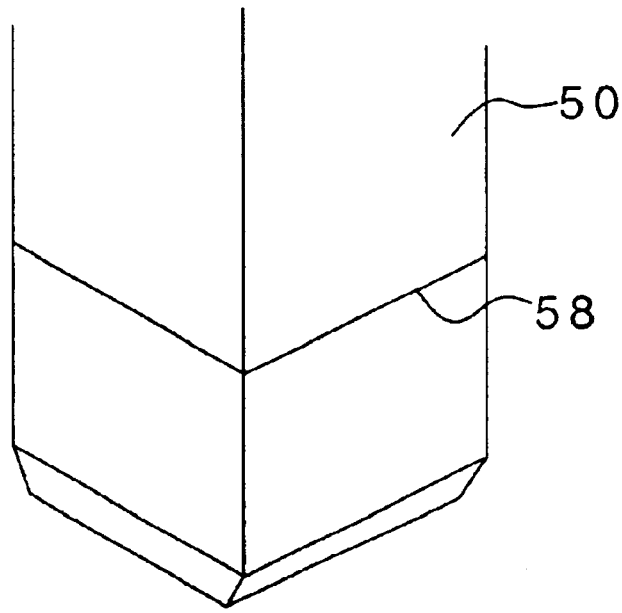
FIG. 14 is a diagram illustrating an image of the upper rack and the lower rack according to another embodiment of the present invention.
Figure 14:
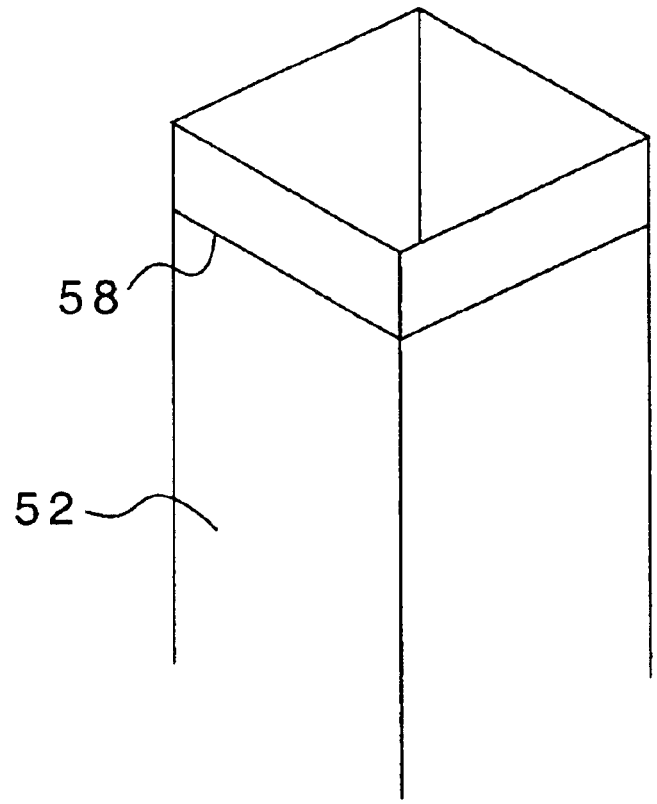

Digitized images from the sensors 16 of the interfaces are input to the processor 18. Both images may, for example, be parallel-processed by the processor 18. The preprocessing module 22 detects line segments in the captured images, as described hereinbefore, which are used to find edges of objects in the image. From the found edges determined by the preprocessing module 22, the recognition module 24 detects and recognizes a particular arrangement of line segments, as described hereinbefore, which may, for example, correspond to the leg 50 of the rack 20a and the receptacle 52 of the rack 20b. In order to augment system robustness, fiducials may be placed on the leg 50 and the receptacle 52. The fiducials may be, for example, reflective members, such as brilliant white squares 54, 56 as illustrated in FIG. 13, which facilitate recognition by the recognition module 24. In another embodiment, illustrated in FIG. 14, the fiducials may be laser line segments 58 projected onto the leg 50 and the receptacle 52 of the respective racks 20a, 20b. For these embodiments, the system 10 may include light sources 59 directed toward the legs 50 and receptacles 52. For an embodiment using reflective members, the light sources 59 may be, for example, halogen bulbs. For the embodiment illustrated in FIG. 14, the light sources 59 may be laser light sources. The set-up module 26 generates the matrices of correspondence, as described hereinbefore, for each of the sensed images between the candidate arrangements of line segments and the expected pose of the first and second legs 50 and the first and second receptacles 52.

The stacking module 32 is in communication with the set-up module 26 and the integrated motion control module 30. The stacking module 32 guides the vehicle 12 in stacking the racks 20a, 20b, and communicates to the IMC module 30 information concerning the relative position between the legs 50 and their corresponding receptacles 52. To augment system robustness, the stacking module 32 may exploit the fact that the distance between the legs 50 of the rack 20a and the distance between the receptacles 52 of the rack 20b are typically fixed distances due to the rigidity of the racks 20a, 20b. The system 10, therefore, may not be required to compute the position and orientation of each rack 20a, 20b in order to compute the relative distance between the legs 50/receptacles 52. Rather, the stacking module 32 may monitor the relative distance between the legs 50 and the receptacles 52 as determined from the sensed images. The stacking module 32 communicates instructions to the IMC module 30 to move the rack 20a supported by the forks 34 of the vehicle 12 until both sets of legs 50 and receptacles 52 are, for example, vertically aligned. Because of the fixed distance between the legs 50 of the upper rack 20a and the fixed distance between the receptacles 52 of the lower rack 20b, when both sets of legs 50 and receptacles 52 are vertically aligned, the upper rack 20a is in position to be stacked on the lower rack 20b, whereupon the legs 50 will engage the receptacles 52 when the upper rack 20a is lowered. Performance of the system 10 described according to this embodiment is enhanced when the surface on which the lower rack 20b is situated is relatively flat.

Figure 15:
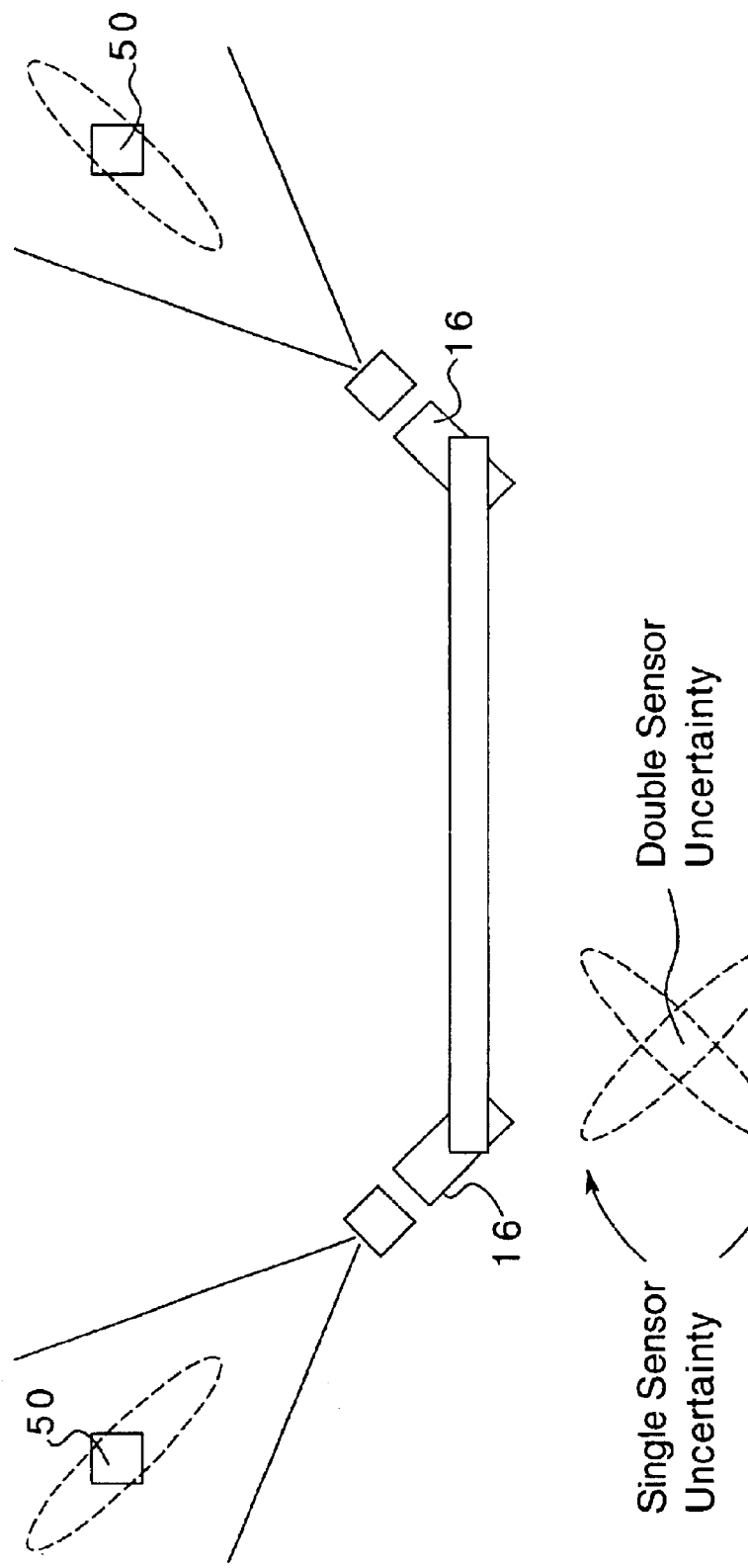
FIG. 15 is a diagram illustrating the sensor orientation of the system of FIG. 10 according to an embodiment of the present invention.

With each sensor 16 is associated an ellipse of uncertainty in the position of the leg 50/receptacle 52 due to limitations of the sensors 16. FIG. 15 is a diagram illustrating the ellipse of uncertainty for each sensor 16. Because the distance between the legs 50 of the upper rack 20a (or the receptacle 52 of the lower rack 20b) are fixed, the system 10 uncertainty can be represented as the cross-section of the ellipse of uncertainty for each sensor 16 (double sensor uncertainty). When the angle θ between the orientations of the sensors 16 is ninety degrees, the double sensor uncertainty is minimized, and may practically correspond to the size of the legs 50/receptacles 52, thus providing a reliable and robust system for stacking dunnage.

Figure 16:
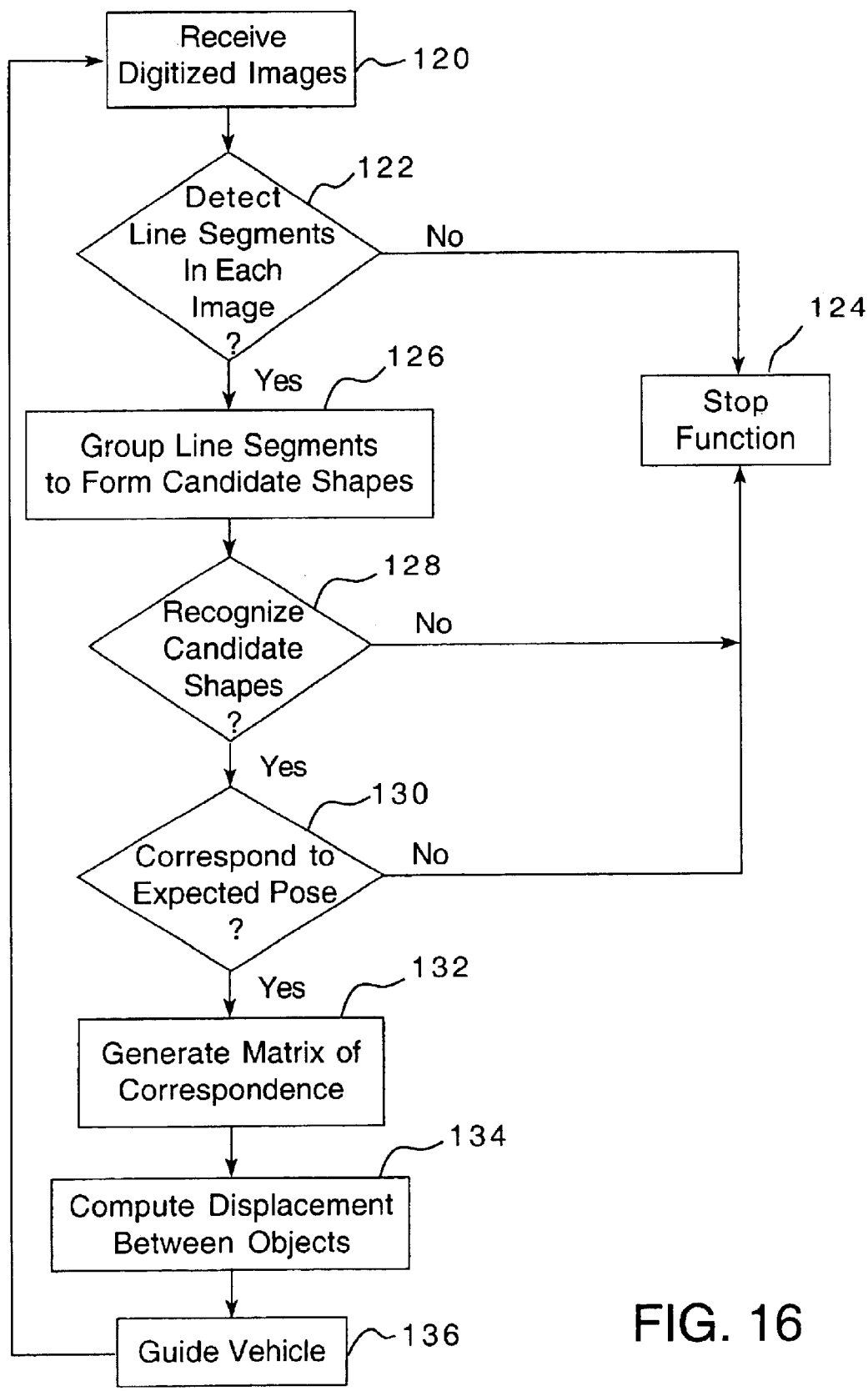
FIG. 16 is a block diagram illustrating the process flow through the processor of FIG. 2 according to another embodiment of the present invention.

FIG. 16 is a block diagram illustrating an embodiment of the process flow through the processor 18 when the system 10 is utilized to stack objects, such as racks 20a and 20b. The process flow begins at block 120, where digitized images of the interfaces between the objects to be stacked are received. The flow proceeds to block 122 where line segments in each of the images are detected. If line segments cannot be detected in the images, the flow proceeds to block 124, where the processing of the images ceases. If line segments can be detected in the images, the flow advances to block 126. Blocks 120 and 122 may be performed by the preprocessing module 22, as described hereinbefore.

At block 126, detected line segments in the images are grouped to form candidate shapes which may correspond to features of the objects to be stacked, such as the legs 50 of the upper rack 20a and their corresponding receptacles 52 of the lower rack 20b or the fiducials placed thereon. The flow then proceeds to block 128, where the candidate shapes which may correspond to the features of the objects are recognized. If candidate arrangements of line segments cannot be recognized, the flow proceeds to block 124. If candidate arrangements of line segments are recognized, the flow proceeds to block 130. The function of blocks 126 and 128 may be performed by the recognition module 24, as described hereinbefore.

At block 130, it is determined whether the candidate shapes correspond to an expected pose of the line segments indicative of the features of the objects. If the candidate arrangements of line segments do not correspond to the expected pose, the flow proceeds to block 124. If the candidate arrangements of line segments do correspond to the expected pose, the flow proceeds to block 132, where the matrix of correspondence is generated. The function of blocks 130 and 132 may be performed by the set-up module 26, as described hereinbefore.

From block 132, the flow proceeds to block 134, where the relative position between the objects to be stacked is computed based on the generated matrix of correspondence. The function of block 132 may be performed by the stacking module 32, as described hereinbefore. From block 132, the flow proceeds to block 134, where power and steering instructions to move one of the objects to be stacked, such as the upper rack 20a supported by the forks 34 of the vehicle 12, are provided to the vehicle 12 based on the computed relative position between the objects. The function of block 134 may be performed by the IMC module 30, as described hereinbefore. From block 136, the flow returns to block 120, where the process flow repeats.

While the present invention has been described in conjunction with preferred embodiments thereof, many modifications and variations will be apparent to those of ordinary skill in the art. The foregoing description and the following claims are intended to cover all such modifications and variations.

What is claimed is:

1. A computer-assisted method for localizing a rack, comprising:
   sensing an image of the rack;
   detecting line segments in the sensed image;
   recognizing a candidate arrangement of line segments in the sensed image indicative of a predetermined feature of the rack;
   generating a matrix of correspondence between the candidate arrangement of line segments and an expected position and orientation of the predetermined feature of the rack; and
   estimating a position and orientation of the rack based on the matrix of correspondence.

2. The method of claim 1, wherein:

recognizing a candidate arrangement of line segments includes recognizing a candidate arrangement of line segments in the sensed image indicative of a pair of fork lift holes of the rack; and generating a matrix of correspondence includes generating a matrix of correspondence between the candidate arrangement of line segments and an expected position and orientation of the pair of fork lift holes of the rack.

3. The method of claim 2, wherein recognizing a candidate arrangement of line segments includes:

grouping the line segments to form candidate shapes indicative of the pair of fork lift holes of the rack; and selecting an arrangement of line segments which most closely corresponds to a shape of the pair of fork lift holes.

4. The method of claim 3, further comprising guiding a vehicle relative to the rack based on the estimated position and orientation of the rack.

5. A system for localizing a rack, comprising:

a sensor;

a preprocessing module in communication with the sensor for detecting line segments in an image of the rack sensed by the sensor;

a recognition module in communication with the preprocessing module for recognizing a candidate arrangement of line segments in the sensed image of the rack indicative of a predetermined feature of the rack;

a set-up module in communication with the recognition module for generating a matrix of correspondence between the candidate arrangement of line segments and an expected position and orientation of the predetermined feature of the rack; and a pose refinement module in communication with the set-up module for estimating a position of orientation of the rack based on the matrix of correspondence.

6. The system of claim 5, wherein the predetermined feature of the rack is a pair of fork lift holes.

7. The system of claim 6, further comprising an integrated motion control module in communication with the pose refinement module.

8. The system of claim 7, wherein the sensor is mounted to a vehicle.

9. The system of claim 8, wherein the integrated motion control module guides the vehicle based on the estimated position and orientation of the rack.

10. The system of claim 5, wherein the sensor is a CCD camera.

11. A system for localizing a rack, comprising:

a sensor;

a first circuit in communication with the sensor for detecting line segments in an image of the rack sensed by the sensor;

a second circuit in communication with the first circuit for recognizing a candidate arrangement of line segments in the sensed image indicative of a predetermined feature of the rack;

a third circuit in communication with the second circuit for generating a matrix of correspondence between the candidate arrangement of line segments and an expected position and orientation of the predetermined feature of the rack; and a fourth circuit in communication with the third circuit for estimating a position and orientation of the rack based on the matrix of correspondence.

12. The system of claim 11, wherein the predetermined feature of the rack is a pair of fork lift holes.

13. The system of claim 11, wherein the sensor is connected to a vehicle.

14. The system of claim 13, further comprising a fifth circuit in communication with the fourth circuit for guiding the vehicle based on the estimated position and orientation of the rack.

15. A system for localizing an rack, comprising:

means for sensing an image of the rack;

means for detecting line segments in the image;

means for recognizing a candidate arrangement of line segments in the sensed image indicative of a predetermined feature of the rack;

means for generating a matrix of correspondence between the candidate arrangement of line segments and an expected position and orientation of the predetermined feature of the rack; and means for estimating a position and orientation of the rack based on the matrix of correspondence.

16. The system of claim 15, wherein the predetermined feature of the rack is a pair of fork lift holes.

17. The system of claim 15, further comprising means for guiding a vehicle based on the estimated position and orientation of the rack.

18. A computer-readable medium having stored thereon instructions which, when executed by a processor, cause the processor to:

detect line segments in an sensed image of a rack;

recognize a candidate arrangement of line segments in the sensed image indicative of a predetermined feature of the rack;

generate a matrix of correspondence between the candidate arrangement of line segments and an expected position and orientation of the predetermined feature of the rack; and estimate a position and orientation of the object based on the matrix of correspondence.

19. The computer-readable medium of claim 18, wherein the predetermined feature of the rack is a pair of fork lift holes.

20. The computer-readable medium of claim 19, having further stored thereon instructions which, when executed by the processor, cause the processor to:

recognize a candidate arrangement of line segments in the sensed image indicative of the pair of fork lift holes; and generate a matrix of correspondence between the candidate arrangement of line segments indicative of the pair of fork lift holes and an expected position and orientation of the fork lift holes.

21. The computer-readable medium of claim 20, having further stored thereon instructions which, when executed by the processor, cause the processor to guide a vehicle based on the estimated position and orientation of the rack.

22. A method of stacking an upper rack on a lower rack, the upper rack having first and second legs a fixed distance apart and the lower rack having first and second receptacles a fixed distance apart, comprising:

sensing a first image including the first leg of the upper rack and the first receptacle of the lower rack;

sensing a second image including the second leg of the upper rack and the second receptacle of the lower rack;

detecting line segments in the first image;

detecting line segments in the second image;

recognizing a candidate arrangement of line segments in the first image indicative of a predetermined feature of the first leg and a predetermined feature of the first receptacle;

recognizing a candidate arrangement of line segments in the second image indicative of a predetermined feature of the second leg and a predetermined feature of the second receptacle;

generating a first matrix of correspondence between the candidate arrangement of line segments indicative of the first leg and the first receptacle and an expected position and orientation of the first leg and first receptacle;

generating a second matrix of correspondence between the candidate arrangement of line segments indicative of the second leg and the second receptacle and an expected position and orientation of the second leg and second receptacle;

determining a relative distance between the first leg and the first receptacle based on the first matrix of correspondence; and determining a relative distance between the second leg and the second receptacle based on the second matrix of correspondence.

23. The method of claim 22, wherein sensing the first image and sensing the second image include simultaneously sensing the first and second images.

24. The method of claim 22, wherein:

sensing the first image includes sensing the first image with a first sensor; and sensing the second image include sensing the second image a second sensor, wherein the first and second sensors are oriented at a non-zero angel relative to each other.

25. The method of claim 22, wherein recognizing a candidate arrangement of line segments in the first image includes recognizing a candidate arrangement of line segments in the first image indicative of a first fiducial on the first leg and recognizing a candidate arrangement of line segments in the first image indicative of a second fiducial on the first receptacle.

26. The method of claim 25, wherein recognizing the candidate arrangement of line segment in the first image includes recognizing a candidate arrangement of line segments in the first image indicative of a first reflective member connected to the first leg and recognizing a candidate arrangement of the line segments in the first image indicative of a second reflective member connected to the first receptacle.

27. The method of claim 25, wherein recognizing the candidate arrangement of line segments in the first image includes recognizing a candidate arrangement of line segments in the first image indicative of a first laser image projected onto the first leg and recognizing a candidate arrangement of the line segments in the first image indicative of a second laser image projected onto the first receptacle.

28. The method of claim 22, further comprising moving the upper rack such that the first leg is vertically aligned with the first receptacle and the second leg is vertically aligned with the second receptacle.

29. A system for stacking an upper rack on a lower rack, the upper rack having first and second legs a fixed distance apart and the lower rack having first and second receptacles a fixed distance apart, comprising:

a first sensor;

a second sensor, wherein the first and second sensors are oriented at a non-zero angle relative to each other;

a preprocessing module in communication with the first and second sensors for detecting line segments in images of the upper and lower racks sensed by the first and second sensors;

a recognition module in communication with the preprocessing module for recognizing a first candidate arrangement of line segments in a first image sensed by the first sensor indicative of a predetermined feature of the first receptacle of the lower rack and a predetermined feature of the first leg of the upper rack, and for recognizing a second candidate arrangement of line segments in a second image sensed by the second sensor indicative of predetermined feature of the second receptacle of the lower rack and a predetermined feature of the second leg of the upper rack;

a set-up module in communication with the recognition module for generating a first matrix of correspondence between the first candidate arrangement of line segments and an expected position and orientation of the first receptacle of the lower rack and the first leg of the upper rack, and for generating a second matrix of correspondence between the second candidate arrangement of line segments and an expected position and orientation of the second receptacle of the lower rack and the second leg of the upper rack; and a stacking module in communication with the set-up module for determining a relative position between the first leg of the upper rack and the first receptacle of the lower rack based on the first matrix of correspondence, and for determining a relative position between the second leg of the upper rack and the second receptacle of the lower rack based on the second matrix of correspondence.

30. The system of claim 29, further comprising an integrated motion control module in communication with the stacking module.

31. The system of claim 30 wherein the first and second sensors are mounted to a vehicle for supporting the upper rack, and the integrated motion control module is for providing steering and power commands to the vehicle.

32. The system of claim 29, wherein at least one of the first and second sensors is a CCD camera.

33. The system of claim 29, wherein the predetermined feature of at least one of the first and second legs of the upper rack and the first and second receptacles of the lower rack is selected from the group consisting of a fiducial and a reflective member.

34. A system for stacking an upper rack on a lower rack, the upper rack having first and second legs a fixed distance apart and the lower rack having first and second receptacles a fixed distance apart, comprising:

a first sensor;

a second sensor, wherein the first and second sensors are oriented at a non-zero angle relative to each other;

a first circuit in communication with the first and second sensors for detecting line segments in a first image sensed by the first sensor including the first leg of the upper rack and the first receptacle of the lower rack, and for detecting a second image sensed by the second sensor including the second leg of the upper rack and the second receptacle of the lower rack;

a second circuit in communication with the first circuit for recognizing a first candidate arrangement of line segments in the first image indicative of predetermined features of the first leg and the first receptacle, and for recognizing a second candidate arrangement of line segments in the second image indicative of predetermined features of the second leg and the second receptacle;

a third circuit in communication with the second circuit for generating a first matrix of correspondence between the first candidate arrangement of line segments and an expected position and orientation of the first leg and first receptacle, and for generating a second matrix of correspondence between the second candidate arrangement of line segments and an expected position and orientation of the second leg and second receptacle; and a fourth circuit in communication with the third circuit for determining a relative distance between the first leg and the first receptacle based on the first matrix of correspondence, and for determining a relative distance between the second leg and the second receptacle based on the second matrix of correspondence.

35. The system of claim 34, further comprising a fifth circuit in communication with the fourth circuit for moving the upper rack such that the first leg is vertically aligned with the first receptacle and the second leg is vertically aligned with the second receptacle based on the relative distances between the first leg and the first receptacle and the second leg and the second receptacle.

36. The system of claim 34, wherein at least one of the first and second sensors is a CCD camera.

37. The system of claim 34, wherein the predetermined feature of at least one of the first and second legs of the upper rack and the first and second receptacles of the lower rack is selected from the group consisting of a fiducial and a reflective member.

38. A system for stacking an upper rack on a lower rack, the upper rack having first and second legs a fixed distance apart and the lower rack having first and second receptacles a fixed distance apart, comprising:

means for sensing a first image including the first leg of the upper rack and the first receptacle of the lower rack;

means for sensing a second image including the second leg of the upper rack and the second receptacle of the lower rack;

means for detecting line segments in the first image and in the second image;

means for recognizing a first candidate arrangement of line segments in the first image indicative of a predetermined feature of the first leg and indicative of a predetermined feature of the first receptacle;

means for recognizing a second candidate arrangement of line segments in the second image indicative of a predetermined feature of the second leg and indicative of a predetermined feature of the second receptacle;

means for generating a first matrix of correspondence between the first candidate of line segments and an expected position and orientation of the first leg and first receptacle;

means for generating a second matrix of correspondence between the second candidate of line segments and an expected position and orientation of the second leg and second receptacle;

means for determining a relative distance between the first leg and the first receptacle; and means for determining a relative distance between the second leg and the second receptacle.

39. The system of claim 38, further comprising means for moving the upper rack such that the first leg is vertically aligned with the first receptacle and the second leg is vertically aligned with the second receptacle based on the determined relative distances between the first leg and the first receptacle and the second leg and the second receptacle.

40. A computer-readable medium having stored thereon instructions which, when executed by a processor, cause the processor to:

detect line segments in a first image of a first leg of an upper rack and a first receptacle of a lower rack;

detect line segments in a second image of a second leg of the upper rack and a second receptacle of the lower rack;

recognize a first candidate arrangement of line segments in the first image indicative of a predetermined feature of the first leg and indicative of a predetermined feature of the first receptacle;

recognize a second candidate arrangement of line segments in the second image indicative of a predetermined feature of the second leg and indicative of a predetermined feature of the second receptacle;

generate a first matrix of correspondence between the first candidate arrangement of line segments and an expected position and orientation of the first leg and first receptacle;

generate a second matrix of correspondence between the second candidate arrangement of line segments and an expected position and orientation of the second leg and second receptacle;

determine a relative distance between the first leg and the first receptacle based on the first matrix of correspondence; and determine a relative distance between the second leg and the second receptacle based on the second matrix of correspondence.

41. The computer-readable medium of claim 40, having further stored thereon instructions which, when executed by the processor, cause the processor to provide steering and power commands to a vehicle supporting the upper rack to move the upper rack such that the first leg is vertically aligned with the first receptacle and the second leg is vertically aligned with the second receptacle.

* * * * *